UNITED STATES PATENT OFFICE.

ONA E. SMITH, OF SAN JOSE, CALIFORNIA.

FOOD COMPOUND.

1,208,850.  Specification of Letters Patent.  Patented Dec. 19, 1916.

No Drawing.  Application filed June 17, 1916.  Serial No. 104,334.

*To all whom it may concern:*

Be it known that I, ONA E. SMITH, a citizen of the United States, residing at 440 South Tenth street, San Jose, in the county of Santa Clara and State of California, have invented a new and useful Food Compound.

My composition consists of the following ingredients, combined in the proportions stated, viz: cured prunes having the pits removed therefrom 3 parts, cured olives having the pits removed therefrom ¾ part, roasted peanuts ¼ part. The olives and peanuts are ground together making an olive peanut paste, enough of the paste being inserted into each prune to take the place of the pit having been removed therefrom. The olives and peanuts are mingled by grinding them together into a paste, and enough of the same is inserted into each prune to fill the place from which the pit has been removed, making a very complete and valuable food product, as the fat contained in the olive and peanuts added to the sugar and the nitrogenous matter of the cured prune provides a perfect, palatable and nutritious food.

Having thus described my invention, what I desire to claim and secure by Letters Patent is:

1. The herein described composition of matter, compounded in the manner and in the quantities substantially as described, consisting of cured prunes having the pits removed therefrom, cured olives having the pits removed therefrom, roasted peanuts ground with the olives into a paste and inserted into said prunes, substantially as described and for the purpose specified.

2. The herein described composition of matter for prune food production consisting of three parts prunes, three-fourths part olives, one-fourth part roasted peanuts, the olives and peanuts being ground together, in the form of a paste and inserted into said prunes, substantially as described and for the purpose specified.

ONA E. SMITH.

Witnesses:
H. L. PARTRIDGE,
E. L. ERWIN.

Copies of this patent may be obtained for five cents each, by addressing the "Commissioner of Patents, Washington, D. C."